April 28, 1925.
A. A. VENETZ
ATTACHMENT FOR STOVES
Filed April 17, 1923
1,535,637
2 Sheets-Sheet 1
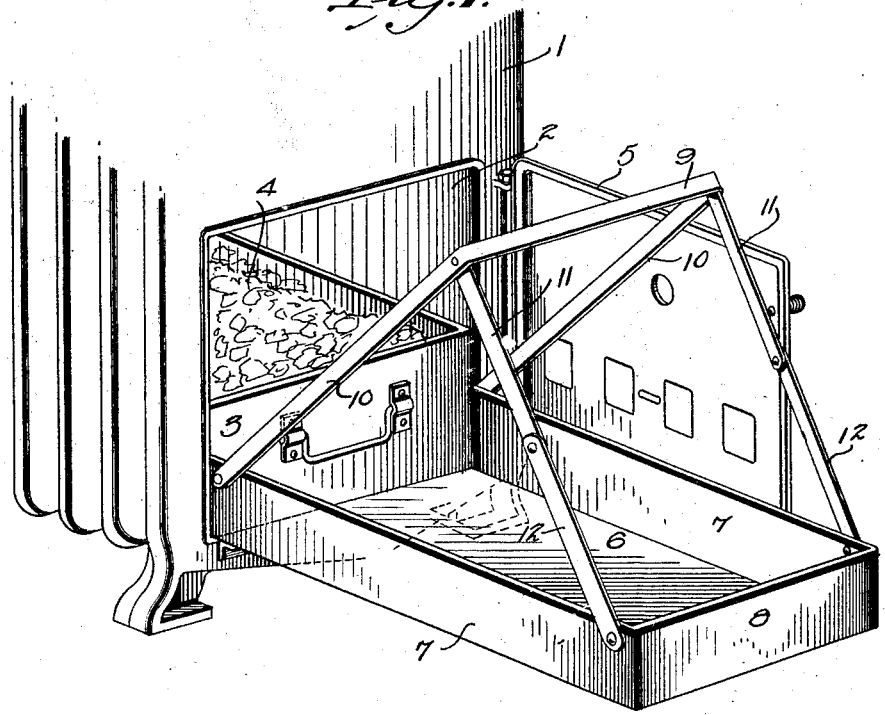
Fig.1.
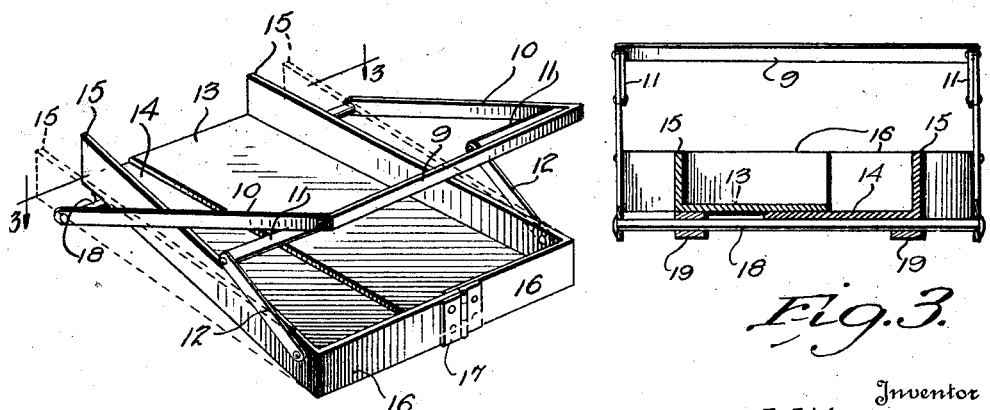
Fig.2.
Fig.3.
Inventor
A. A. VENETZ
By
Attorney April 28, 1925.
A. A. VENETZ
ATTACHMENT FOR STOVES
Filed April 17, 1923
1,535,637
2 Sheets-Sheet 2
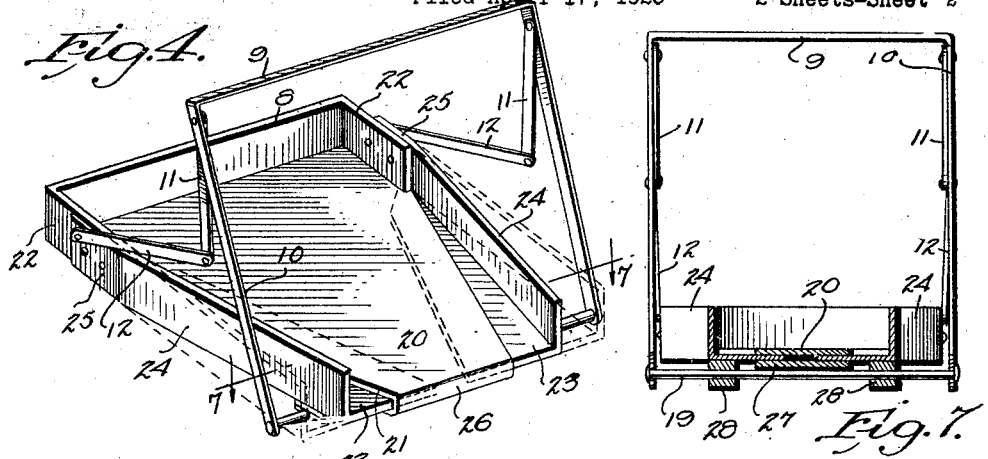
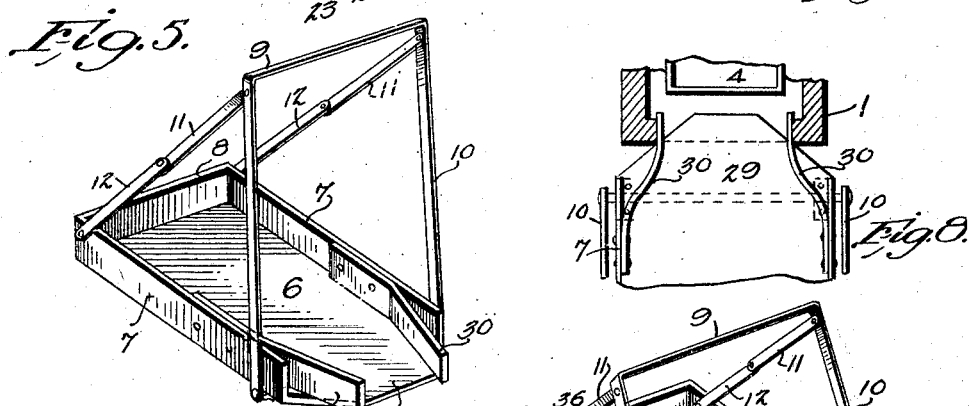
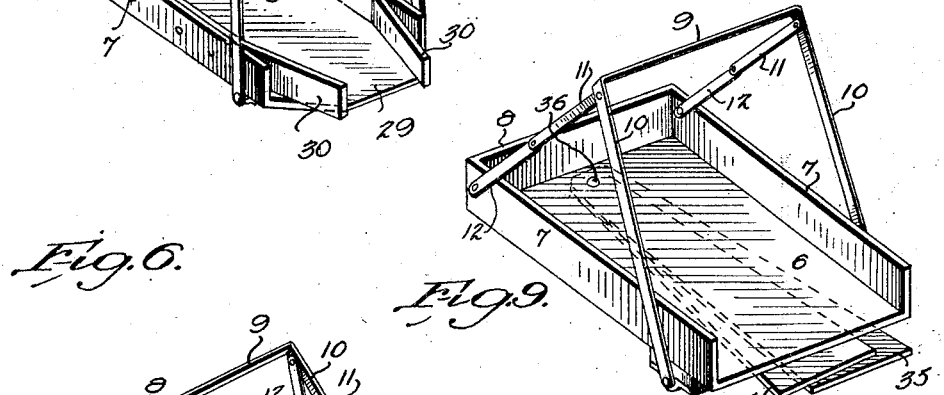
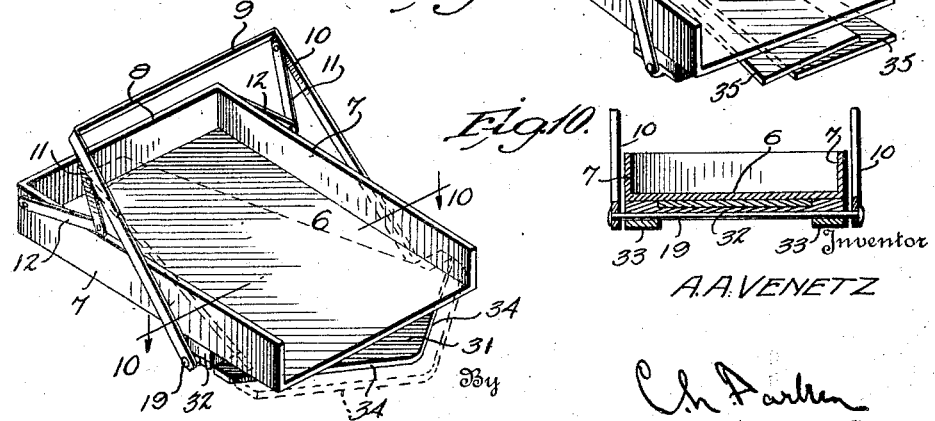
Inventor
A. A. VENETZ
By
Attorney Patented Apr. 28, 1925.

1,535,637

UNITED STATES PATENT OFFICE.

ANDREW A. VENETZ, OF GREAT FALLS, MONTANA.

ATTACHMENT FOR STOVES.

Application filed April 17, 1923. Serial No. 632,769.

*To all whom it may concern:*

Be it known that I, ANDREW A. VENETZ, a citizen of the United States, residing at Great Falls, in the county of Cascade and State of Montana, have invented certain new and useful Improvements in Attachments for Stoves, of which the following is a specification.

This invention relates to stove attachments, and more particularly to trays for use in removing ash pans from stoves.

An object of the invention is the provision of a tray which may be arranged in front of a stove to receive the ash pan, the tray having a suitable bail or handle to permit removal without spilling the contents of the pan.

A further object is the provision of a tray that is adjustable to fit different size stoves.

A further object is the provision of a bail secured to the two sides of the tray at opposite ends which is collapsible and may be folded when the tray is not in use.

In the accompanying drawings, I have shown several embodiments of the invention. In this showing:

Figure 1 is a perspective view of a portion of a stove showing the invention applied, Figure 2 is a perspective view of another form of tray, Figure 3 is a transverse sectional view on line 3—3 of Figure 2, Figure 4 is a perspective view of another form of the invention, Figure 5 is a similar view of another form of the invention, Figure 6 is a similar view of another form of the invention, Figure 7 is a transverse sectional view on line 7—7 of Figure 4, Figure 8 is a plan view of a portion of the tray shown in Figure 5 of the drawings, a portion of the stove being shown in horizontal section to illustrate the application of this form of the device, Figure 9 is a perspective view of another form of the invention, and, Figure 10 is a transverse sectional view on line 10—10 of Figure 6.

Referring to the drawings, the reference numeral 1 designates generally a stove having an ash pit 2. An ash pan 3 is arranged in the stove and is adapted to receive ashes 4. The pit is provided with a door 5. In removing the ash pan from the stove, the contents are frequently spilled on the floor and in order to prevent this, I provide a tray adapted to be arranged in front of the stove and receive the ash pan. In the form of the invention shown in Figure 1 of the drawings, the tray consists of a bottom 6 having side walls 7 and a rear wall 8. The front of the tray is open as shown, which permits it to be arranged in front of the stove and the ash pan slid into the tray. The tray containing the ash pan may be removed from the stove and the ashes dumped by means of a bail or handle 9, having arms 10 pivoted to opposite sides of the tray at the front end. An arm formed of a pair of links 11 and 12 is secured to the handle at each side and extends rearwardly, being secured to the side walls 7 of the tray adjacent its rear end. By forming the arm of a pair of links, pivotally connected to each other, these arms may be folded downwardly as shown in Figure 2, and the handle arranged in a position adjacent the tray when the device is not in use.

In the form of the invention shown in Figures 2 and 3 of the drawings, the tray consists of a pair of bottom sections 13 and 14, one of which is arranged beneath the other, as shown. Each of these sections is provided with side walls 15 and rear wall sections 16. The rear wall sections are connected to each other by a hinge 17, which permits the two sections of the tray to be adjusted to provide varying widths at the front. This permits the tray to be used with different size stoves and the front end adjusted to the width of the stove. The bail or handle employed in this form of the device is substantially the same as that shown in Figure 1 of the drawings. The arms 10, however, are connected to a rod 18 which passes under the bottom sections as shown in Figure 3 of the drawings. Adjacent each side, there is provided a sleeve 19, adapted to receive this rod. As shown, the rod forms a guide for the lower sections 13 and 14 of the bottom.

In the form of the invention shown in Figures 4 and 7 of the drawings, the tray is provided with a bottom 20, the sides 21 of which taper toward the front. It is further provided with side walls 22 terminating at the point where the tapering of the sides begins. An adjustable bottom section 23 is arranged on each side of the tapering portion of the bottom. As shown, these sections are provided with side walls 24, connected to the side walls 22, at 25, to permit adjustment. The forward end of the main bottom is extended downwardly, as at 26, and is then provided with a rearward extension 27 arranged beneath the adjustable bottom sections 23 and forming a guide therefor. In this form of the invention, the handle supporting rod 19 is mounted in sleeves 28, carried by the adjustable bottom sections.

The form of the invention shown in Figures 5 and 8 of the drawings differs from that shown in Figure 1 in that the main bottom 6 is provided with a tapering extension 29, arranged forwardly of the ends of the side walls 7. Auxiliary flexible side walls 30 are secured to the main side walls and extend over the tapering section 29 of the bottom.

In the form of the invention shown in Figures 6 and 10 of the drawings, there is provided an auxiliary bottom 31 slidably mounted between the main bottom 6 and a plate 32. This plate carries sleeves 33 which support the rod 19. The forward end of the auxiliary bottom is provided with tapered edge 34, forming a triangular section which may be extended in front of the main bottom to fit the ash door opening of different size stoves.

In the form of the invention shown in Figure 9 of the drawings, there is provided an auxiliary bottom consisting of a pair of fan-shaped members 35, pivoted to the main bottom at 36. These fan-shaped sections extend beyond the main bottom and can be adjusted to provide different widths.

The operation of the device will be apparent from the foregoing description. When arranged in front of a stove, as shown in Figures 1 and 8 of the drawings, the ash pan may be removed from the stove on to the tray without spilling the contents of the pan. The pan and tray may then be removed from the stove to dispose of the contents of the pan. Particular attention is called to the construction of the bail or handle which supports the tray at its four corners. Ash pans have frequently been provided with bails secured to the side walls centrally thereof. When an attempt is made to carry a pan by a bail of this character, one end of the pan frequently tips, due to the greater weight of its contents, and the ashes are spilled on the floor.

In the various forms of the invention, shown in Figures 2 to 10 of the drawings, means are provided for adjusting the width of the front end of the tray to permit its use with different size stoves. By means of any of these adjustments, it is possible to employ the tray with any stove whose width is less than the width of the rear portion of the tray.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. A tray for use in removing ash pans from stoves comprising a bottom, side walls, and a rear wall, said bottom and side walls being adjustable at the front of said tray to vary the width of the front end of said tray, the front of said tray being open to permit it to be arranged in front of a stove and the ash pan placed thereon by sliding it from the stove, and a bail secured to said tray.

2. A tray for use in removing ash pans from stoves comprising a bottom, side walls, and a rear wall, the front of the tray being open to permit it to be arranged in front of a stove to receive the ash pan as it is removed from the stove, and a bail comprising a transverse member having an arm at each end, said arms being connected to opposite sides of the tray adjacent its front end, and a pair of links connected to opposite sides of the tray adjacent its rear end and to said transverse member.

3. A tray for use in removing ash pans from stoves comprising a bottom, side walls, and a rear wall, the bottom of said tray being formed of a plurality of sections to permit adjustment in width adjacent the front of said tray, the front of said tray being open to permit it to be arranged in front of a stove to receive the ash pan as it is removed from the stove, and a bail secured to said tray.

4. A tray for use in removing ash pans from stoves comprising a bottom, side walls, and a rear wall, the front of the tray being open to permit it to be arranged in front of a stove to receive an ash pan, a rod extending beneath the bottom of the tray adjacent the front and projecting beyond the side walls, a bail secured to the ends of said rod, and a pair of links connected to opposite sides of the tray adjacent its rear end and to said bail.

In testimony whereof, I affix my signature in the presence of two witnesses.

ANDREW A. VENETZ.

Witnesses:
DEAN STANLEY,
BERNICE ENGELKA.